Figure 1:
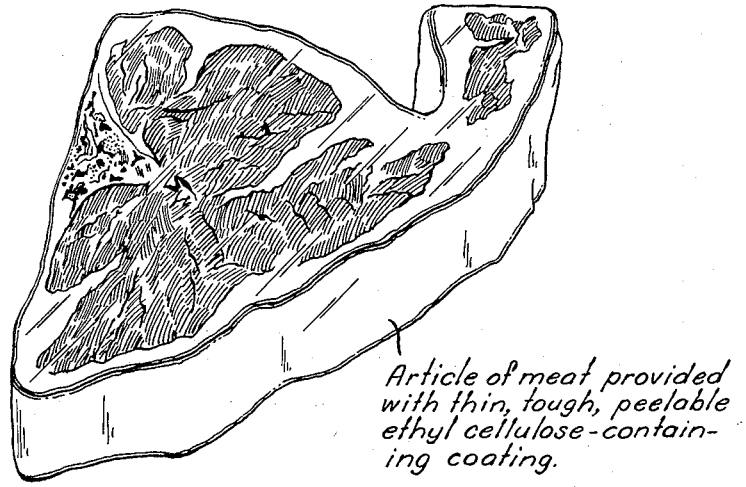

June 24, 1958  J. R. WIRT ET AL  2,840,476
METHOD FOR COATING FOODSTUFFS AND ARTICLE THEREBY OBTAINED
Filed Aug. 29, 1957

Article of meat provided with thin, tough, peelable ethyl cellulose-containing coating.

Thin, tough, peelable ethyl cellulose-containing coating

INVENTORS.
James R. Wirt
Harold C. Kelly
BY
Griswold & Burdick
ATTORNEYS

United States Patent Office 2,840,476
Patented June 24, 1958

2,840,476

METHOD FOR COATING FOODSTUFFS AND ARTICLE THEREBY OBTAINED

James R. Wirt and Harold C. Kelly, Midland, Mich., assignors to The Dow Chemical Company, Midland, Mich., a corporation of Delaware Application August 29, 1957, Serial No. 681,099

16 Claims. (Cl. 99—166)

This invention relates to coating compositions comprising cellulose ethers which are especially suited for enveloping certain articles of food, particularly meat and meat products, in tightly-adhering, protective coatings which may be readily stripped or peeled from the article. More particularly, it is concerned with such coating compositions that are applied from, or while they are in, the molten condition. In order to avoid sesquipedal and cumbrous expressions, compositions of the indicated nature are frequently referred to as "hot melts." Pursuant to such terminology, they are characterized by such term throughout the following description and specification. The present invention also has reference to a method for coating food articles with the referred-to compositions and to coated articles thereby obtained. The present application is a continuation-in-part of the application for United States Letters Patent having Serial No. 554,449, which was filed on December 21, 1955.

It would be advantageous to provide certain articles of food, particularly meat and meat products, with tough, closely conforming coatings which have protective and preservative value and which could be readily removed by clean and efficient stripping or peeling operations. It would be additionally beneficial for such a coating to be imbued with other desirable characteristics, including flexibility at temperatures which are commonly encountered in refrigerators and food freezers; attractive appearance and, quite commonly, a desirably dry feel upon handling (being free from repulsive characteristics in this regard); relatively high impermeability to gases and water and other common vapors to minimize or prevent the occurrence of intolerable oxidation, dehydration or contamination in the coated foodstuff; and, as a primary requirement, absolute non-toxicity, i. e., freedom from any tendency to transfer deleterious or harmful materials to the foodstuff. It would be of even greater advantage and desirability if the coatings would be available in a relatively transparent and pellucid condition, or in a condition in which they were at least free from excessive opacity, in order to permit ready and reliable visual inspection of the coated article. It would be an exceptional advantage and a pronounced benefit for such coatings to be obtainable from readily available and inexpensive materials and to be utilizable in a convenient and economical manner.

These desiderations and many other advantages and benefits which hereinafter are manifest may be realized with and achieved by coating compositions that are in accordance with the present invention which are basically comprised of a mixture that essentially consists of between about 19 and 70 percent by weight of ethyl cellulose; between about 15 and 65 percent by weight of a refined mineral oil; and between about 5 and 30 percent by weight of a non-toxic plasticizer which is a solvent for the cellulose ether. Advantageously, compositions that are in accordance with the present invention may also be prepared so as to contain up to about 20 percent by weight, based on the weight of the composition, of an acid-accepting, epoxidized long chain fatty acid triglyceride or the like constituent; up to about 3 percent by weight of a non-toxic antioxidant component; and up to about 2 percent by weight of a suitable color-stabilizing ingredient. Likewise, if desired, and if absolute clarity is not an essential requirement or vital factor in the resulting coating, minor proportions of various wax constituents may also be incorporated in the compositions.

All of the compositions of the present invention ordinarily form molten mixtures at temperatures that are in excess of the boiling point of water. They may be applied in any desired manner to articles which may be at any temperature beneath that of the hot melt. Advantageously, particularly when fresh meat or meat products are involved, the coating composition may be applied by a method which comprises freezing the article, or at least the surface of the article of food to be coated; and coating the frozen article with the molten composition. Such a method is beneficial in that the surface of the article being coated, particularly meats and the like, is less likely to thus be subjected to discoloring temperatures and vaporization of surface juices.

Brushing, spraying, splashing, dipping and other techniques may be employed in order to apply the beneficial coating compositions of the invention to the articles being coated. It is frequently expedient to employ dip coating techniques for this purpose, wherein the articles are dipped in a suitable molten composition to effect the coating "pick-up," after which they are withdrawn and the applied coating composition permitted to cool and harden. In many cases, however, particularly when high production rates must be attained, it is exceptionally expedient to employ spray or splash coating techniques in order to manufacture the desired coated articles, wherein each of the articles to be coated is passed under or over, or both, one or more sprays of the molten composition or through one or more curtains or sheets thereof, or is otherwise splashed thoroughly therewith, to cover their entire surface in order to effect the desired "pick-up" of the coating. The precise constitution of the compositions that are employed may vary according to preferred embodiments, as will hereinafter be more fully delineated, each depending somewhat for optimum effect on the precise coating technique that is intended to be employed. In this way, under any given conditions of application, the operation may be most beneficially facilitated and the most effective and advantageous application of the desired coating provided on the articles.

Coated articles of food, particularly meats, in accordance with the present invention generally have an attractive and pleasing appearance. As a rule, their transparency is sufficiently good and near or at clarity to permit ready visual inspection and evaluation of the foodstuff. As a matter of fact, many of the coatings that may be provided in accordance with the present invention have highly attractive and exceptionally pleasing appearances in this regard, being absolutely transparent, as has been indicated, over a wide temperature range, even at temperatures as low as those in the neighborhood of about —20° F. and lower.

Unlike most of the coatings from conventional hot melt compositions, the coatings of the present invention are not sticky, oily, greasy or otherwise objectionable or uncomfortable to touch or handle. As a matter of fact, the coatings of the present invention generally have a desirable and quite acceptable relatively "dry"

feel upon being handled and are not in the slightest objectionable from such viewpoint. Neither do they cause oleaginous deposits or contamination to occur upon the hands of a person or upon other surfaces with which they may come in contact. The coatings which are provided adhere tightly as a thin film about the articles and conform closely to their contours, even when bony meats or fowl are involved. They are non-toxic and odorless and do not impart odors or tastes to the food being coated. They are readily peelable, cuttable or strippable in a clean and efficient manner from the article of food. Thus, they do not require resort to washing or other tedious and inconvenient procedures for their complete removal.

As indicated, the coatings are relatively flexible and remain remarkably strong and tough at temperatures as low as about −20° F. so that they resist damage due to handling (including severe scuffing and jostling) and storage of a coated article being maintained in a frozen condition. They also have an extremely low rate of water vapor transmission. Their characteristics in this regard are comparable to those which are found in other distinct varieties of ethyl cellulose type coatings. Thus, the coated articles may be preserved in a better condition and are less susceptible to becoming rancid or dehydrated or to develop "freezer" burn. Despite their advantageous relative impermeability, however, the coatings of the present invention are adapted to permit passage of sufficient oxygen so that coated fresh meats, for example, can readily retain their desirably fresh and natural color. In addition, the applied coating compositions of the present invention effectively prevent the absorption of undesirable foreign odors and tastes in the food product.

The ethyl cellulose which may be employed in the practice of the present invention is a commonly available material having ethoxyl content in the range from about 47.5 to about 50 percent by weight. In many cases it may be desirable to utilize a cellulose ether having an ethoxyl content of from about 48.0 to 49.5 percent by weight. Its viscosity, as determined in a solution of about 5 percent by weight of the ethyl cellulose in a solvent mixture consisting of about 80 parts by volume of toluene and by about 20 parts by volume of ethanol, may be from about 6 to about 200 centipoises (cps.). In many cases, it is more convenient and may be of greater expediency and practicality to employ a cellulose ether having a viscosity that is not in excess of about 50 cps. The particular viscosity grade of cellulose ether that is employed as well as the precise formulation of composition that is utilized depends, as has been indicated, upon the manner of application contemplated for the particular composition being used to coat the articles. For example, when a dip application of the coating is intended to be made, the viscosity of the cellulose ether that is employed should not be in excess of about 30 cps., and, even more beneficially, may be in the neighborhood of 6 to 11 cps. A preferred formulation of the composition for dip application is set forth in the following recipe:

RECIPE I.—PREFERRED HOT MELT FOR DIP COATING

| | Percent by weight |
|---|---|
| Ethyl cellulose, 30 cps. or less | 20 to 35 |
| Refined mineral oil | 50 to 65 |
| Non-toxic plasticizer | 5 to 20 |
| Epoxidized natural glyceride of unsaturated fatty acids | 0 to 10 |
| Antioxidant | 0 to 2 |
| Color stabilizer | 0 to 0.5 |

When the coating is to be applied by spraying or splashing techniques which generally are accomplished by means of apparatus or machinery which is adapted for such purpose, a higher viscosity cellulose ether may generally be utilized and a more viscous overall composition employed. A desirable formulation of the compositions in accordance with the present invention is as follows:

RECIPE II.—PREFERRED HOT MELT FOR SPRAY COATING

| | Percent by weight |
|---|---|
| Ethyl cellulose, 50 cps. or less | 20 to 50 |
| Refined mineral oil | 30 to 65 |
| Non-toxic plasticizer | 5 to 20 |
| Epoxidized natural glyceride of unsaturated fatty acids | 0 to 10 |
| Antioxidant | 0 to 2 |
| Color stabilizer | 0 to 0.5 |

As mentioned, the oleaginous constituent that is employed in the compositions of the present invention is a refined mineral oil of a paraffinic variety or an equivalent material derived from a naphthenic petroleum source. It is desirable and ordinarily preferable for light color or water white mineral oils to be employed. Mineral oils having a viscosity in the range from about 80 to about 400 Saybolt units at 100° F. are ordinarily most advantageous to employ.

The plasticizer or plasticizing component which is utilized should be a solvent for the cellulose ether which is compatible with other constituents of the composition. Suitable plasticizers for practice of the present invention include such colorless, odorless and non-toxic materials as those which are ester plasticizers for ethyl cellulose such as alkyl phthalyl alkyl glycolates (specifically methyl phthalyl ethyl glycolate; ethyl phthalyl ethyl glycolate; and butyl phthalyl butyl glycolate; trialkyl esters of acyl citric acid (specifically acetyl tributyl citrate such as that which may be obtained under the trade-designation "Citroflex A–4"); dialkyl adipates (specifically diisobutyl adipate); various acetylated mono- and di-fatty acid glycerides; certain dialkyl phthalates (specifically di-2-ethylhexylphthalate); various fatty acid ester derivatives (including glycerol mono-oleate; glycerol mono-stearate; and n-butyl stearate); alkyl-aryl phosphate; castor oil; and the like. It may frequently be beneficial to employ mixtures of various plasticizing materials in the hot melt compositions. The plasticizer acetyl tributyl citrate may be utilized with great advantage for purposes of the invention. Castor oil may also be emyployed with benefit and such plasticizers as butyl phthalyl butyl glycolate are likewise quite suitable for use.

The epoxidized long chain fatty acid triglycerides that may be employed in the practice of the present invention are useful to inhibit hydrolytic degradation of the ethyl cellulose. Such materials are sometimes referred to as being epoxidized natural glycerides of unsaturated fatty acids. Ordinarily, they are derived from fatty acids that contain between about 12 and 22 carbon atoms. Such acid-accepting epoxy materials may be specifically typified and particularized by such compositions as epoxidized soya bean oil, including those products of this variety which may be obtained under the trade-designations "Paraplex G–60" and "Paraplex G–62," respectively.

Various non-toxic antioxidants are also advantageous to employ in the compositions of the invention in order to inhibit oxidative degradation of the ethyl cellulose and any fatty acid glycerides that may be present therein. Typical of such antioxidants are butylated hydroxy anisol; nordihydroguaiaretic acid; 2,6-ditertiary butyl-4-methyl phenol which is obtainable under the trade-designation "Ionol"; and certain substituted butylated phenols such as those which are commercially available under the trade-designation "Voidox."

It is also beneficial in many instances to incorporate certain non-toxic color stabilizers in the compositions to facilitate the retention of a desirably clear and free from discoloration condition in the coating. Advantageously, the color stabilizers that may be utilized are those which are disclosed in the copending application United States Letters Patent of the present applicant Wirt having Serial No. 663,613 which was filed on June 5, 1957. Thus such organic acids as citric acids and tartaric acid may be utilized with great advantage. Other color stabilizers which may be employed include various organic phosphites such as tricresyl phosphite and mixed organic phosphite-epoxy compounds including those that may be obtained under the trade-designations "Advastab CH–49" and "Advastab CH–201."

If desired, any of a variety of paraffin and microcrystalline waxes may be utilized in the practice of the invention, including, advantageously, such materials as paraffin; hydrogenated castor oil (a synthetic wax); ceresin; ozokerite; carnauba wax; and beeswax, all of which melt at temperatures in excess of about 100° F. Ordinarily, up to about 5 percent by weight, based on the weight of the composition, of a wax may be suitably included in the formulation without depriving the resulting coating of sufficiently good transparency and near clarity to permit easy visual inspection and evaluation of a foodstuff enveloped therein. Regardless of the slight effect upon transparency characteristics, the coatings obtained from the compositions prepared with tolerable quantities of the wax ingredients within the indicated limits exhibit good flexibility, even at freezer temperatures, and have a desirably dry feel. Ordinarily, the use of a wax ingredient serves to control the viscosity characteristics of the resulting hot melt. Thus, incorporation of a wax ingredient in a composition may be particularly advantageous when dip and the like applications are contemplated for the coating wherein excessively viscous hot melts are ordinarily undesirable to employ. When machine spraying or splashing applications are utilized, however, more viscous compositions may generally be suitably handled so that use of the wax ingredient need not be predicated on such considerations.

In preparing the hot melt coating compositions of the present invention, care should be taken to select such relative proportions of the ingredients as will produce a coating having optimum characteristics within the range dictated by its own inherent limitations. In addition, as has been indicated, both the proportions and the nature of the specific ingredients employed should take into account the type of application intended for the composition, particularly with respect to the viscosity of the cellulose ether constituent and the proportion of the oleaginous constituent that may be employed. Thus, with some combinations of ingredients, a larger proportion of the ethyl cellulose or a higher viscosity grade of such constituent may produce a more viscous hot melt than is desirable for particular operating temperatures or particular modes of application where as smaller proportoins, in some instances, may not lend sufficient strength to the film coating. Smaller quantities of the oleaginous constituent may also increase the viscosity of the hot melt. Similarly, greater amounts of the oleaginous constituent may sometimes tend to yield an undesirably oil film coating. In an analogous manner, too much plasticizer may at times produce a film coating which is softer and more oily than might be otherwise obtained. The same consequences may result from various combinations of the epoxidized natural glyceride of unsaturated fatty acids (when such constituent is utilized) especially in its combination with the plasticizing ingredient. On the other hand, the use of too small a quantity of the plasticizer may, in certain instances, impart undesirable brittle characteristics to the film coating. Likewise, as has been explained, larger relative proportions of the wax may result in a film coating which tends more to opacity and should be avoided where exceptionally good transparency is a desired quality or factor.

Since the hot melt compositions of the present invention are at relatively high temperatures during their application, it is advantageous to coat many articles while they are in a frozen condition. This minimizes the possibility of causing slight surface discoloration and dehydration of the foodstuff, particularly when meat and meat products are being coated. It also obviates any objections to the coated articles which may arise for such reasons. The discolorations which may occur from coating food articles at normal temperatures are innocuous, however, and bear no relationship to their quality or wholesomeness in any consideration other than appearance. Thus, if it is otherwise suitable, articles which are not in a frozen condition may be satisfactorily coated with the compositions of the present invention. As a matter of fact, there are many instances when no significant advantage may be derived by chilling or freezing the article before coating. This may be the case, for example, when various smoked or cured meats, fish or fowl are being coated. The normal, treated appearance of such foodstuffs is acceptable and does not detract from their marketability, although they actually are discolored from a natural condition.

The invention is further illustrated in and by the following examples wherein, unless otherwise indicated, all parts and percentages are to be taken by weight.

*Example A*

Figure 2:
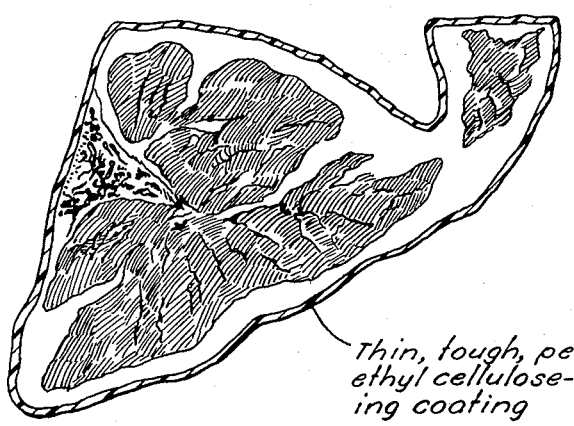

Various cuts of meat, including steaks, chops, and roasts from beef, lamb and pork as well as liver, fish, bacon and several varieties of luncheon meat were coated by first freezing and then dip coating them with a hot melt at about 320° F. which was comprised of about 23.0 parts of ethyl cellulose of a viscosity grade of about 10 cps. that was obtained under the trade-designation "Ethocel"; about 62.7 parts of a refined mineral oil mixture which consisted of equal weight proportions of a refined mineral oil having a viscosity between about 345 and 355 Saybolt units at 100° F. which was obtained under the trade-designation "Kaydol" and another refined mineral oil having a viscosity between about 95 and 105 Saybolt units at 105° F. which was obtained under the trade-designation "White Oil L–1"; and about 14.3 parts of a plasticizer combination consisting of about 11.5 parts of a refined and deodorized castor oil obtained under the trade-designation "Crystal-O"; 1.4 parts of an acetylated mono-glyceride obtained under the trade-designation "Myvacet 9–40"; and about 1.4 parts of glycerol mono-oleate obtained under the trade designation "Myverol 18–71". After the dipping, the applied coating was allowed to cool and harden. All of the coated articles, as schematically illustrated in a perspective view in Figure 1 and in cross-section in Figure 2 of the accompanying drawing, had an attractive and pleasing appearance and were not objectionable to the touch. The applied coating adhered tightly to each of the articles and conformed closely to them as a thin enveloping film about their various irregular contours. It was completely transparent, allowing visual inspection of the coated articles which retained their essential natural appearances. The coating was remarkably tough and did not become embrittled at freezing temperatures. It did not rupture upon repeated dropping of the frozen articles or even when the articles were subjected to such purposely abnormal and abusive handling as being repeatedly thrown and skidded over concrete floors. It could be stripped cleanly from the articles without remnants or segments of the coating adhering to the foodstuff. This permitted the articles to be obtained in their normally available condition after being freed of the coating. In addition, the coating provided excellently indefinite protection against "freezer burn" as evidenced by the fact that no appreciable indication of such condition could be observed in coated articles that were maintained in a frozen condition for periods as long as 20 months or more.

Equivalent results are similarly obtainable with poultry, if care is taken to suitably plug or cover the cavities in their dressed carcasses. Various cheeses may also be coated satisfactorily with the above hot melt composition and others in accordance with the invention.

*Example B*

The procedure of Example "A" was repeated with a dip coating composition having the following formulation:

| | Parts |
|---|---|
| Ethyl cellulose, 10 cps. | 23 |
| Refined mineral oil, Saybolt viscosity at 100° F. 95/105 units | 62 |
| Butyl phthalyl butyl glycolate | 15 |

The results commensurate to those obtained in Example A were achieved when the same coating procedure as therein described was repeated on various foodstuffs, including meats.

*Example C*

A dip coating composition, used in the manner described in Example A and providing similar excellent results, had the following formulation:

| | Parts |
|---|---|
| Ethyl cellulose, 10 cps. | 22.9 |
| Refined mineral oil, Saybolt viscosity at 100° F., 95/105 units | 62 |
| Acetyl tributyl citrate ("Citroflex A-4") | 7 |
| Castor oil ("Crystal-O") | 6 |
| "Paraplex G-62" | 2 |
| Citric acid | 0.1 |

*Example D*

A formulation was prepared for machine application on foodstuffs having the following composition:

| | Parts |
|---|---|
| Ethyl cellulose, 10 cps. | 32 |
| Refined mineral oil, Saybolt viscosity at 100° F. 95/105 units | 53 |
| "Myverol 18-71" | 1.36 |
| "Myvecet 9-40" | 1.5 |
| "Citroflex A-4" | 3.0 |
| "Crystal-O" | 5.0 |
| "Paraplex G-62" | 4.0 |
| Citric acid | 0.14 |

The composition was applied on various articles of food including beef, pork and poultry by passing the articles through a sheet-like screen or curtain of the hot melt composition that was forced in an enveloping pattern over and upon the articles through ejection nozzles adapted for the purpose. Some of the articles were coated while frozen and others while they were at normal refrigerator temperatures. The applied coatings had average thicknesses between about 10 and 50 mls. After the treatment, the coating was permitted to cool and harden. All of the coated articles had characteristics at least as good as those set forth in the first example with the resulting coatings, in general, having even greater film strengths and a better or relatively more "dry" feel.

*Example E*

The procedure of Example D was repeated to spray coat various articles of food with the following formulation especially prepared for the intended method of application:

| | Parts |
|---|---|
| Ethyl cellulose, 20 cps. | 25.9 |
| Refined mineral oil, Saybolt viscosity at 100° F. 95/105 units | 60 |
| "Citroflex A-4" | 7 |
| "Crystal-O" | 6 |
| "Paraplex G-62" | 2 |
| Citric acid | 0.1 |

Excellent results were obtained. The coating applied on the articles had properties about equivalent to those of Example D. Excellent results were also obtained with compositions similar to the foregoing when any one or two or the two last-mentioned ingredients were eliminated from the formulation.

Completely satisfactory results may also be achieved when ethyl cellulose of a viscosity grade of 50 cps. or higher is used in compositions similar to the above and that of Example D for machine application.

*Example F*

Pursuant to the foregoing procedure, various cuts of meat were coated by first freezing them and then dip coating them with a hot melt at about 320° F. which was comprised of about 28.0 parts of 10 cps. ethyl cellulose; about 50.8 parts of a refined mineral oil mixture which consisted of equal weight proportions of a refined mineral oil having a viscosity between about 345 and 355 Saybolt units at 100° F. and another refined mineral oil having a viscosity between about 95 and 105 Saybolt units at 105° F.; about 19.2 parts of butyl phthalyl butyl glycolate; and about 2 parts of paraffin wax having a melting point of about 135° F. After the dipping, the coating was allowed to cool and harden. The applied coating adhered tightly to each of the articles and formed a thin enveloping film about them. The coating was quite tough and was not brittle at freezing temperatures. It was nearly completely transparent and permitted the coated articles to be visually inspected. The wax-containing coating could also be stripped cleanly from the articles so as to readily allow the articles to be obtained in their normally available condition after being freed of the coating. As in the foregoing examples, the wax-containing coating also provided excellent protection for the articles when they were kept frozen for long periods of time.

Similar excellent results may also be obtained when the paraffin wax ingredient is substituted with hydrogenated castor oil; carnauba wax or beeswax.

It is to be fully understood that the scope and purview of the present invention is to be construed from the following claims rather than strictly from the foregoing docent specification and description.

What is claimed is:

1. Method for coating articles of food which comprises the steps of (1) applying to the article, while it is being maintained at a relatively lower temperature, a thin enveloping film of a coating from a composition in molten form comprising essentially (a) from 19 to 70 percent by weight of the composition of an ethyl cellulose having an ethoxyl content between about 47.5 and 50 percent by weight and a viscosity between about 6 and 200 centipoises, as determined in a 5 percent by weight solution thereof in an 80:20 mixture, by volume, of toluene and ethanol; (b) between about 15 and 65 percent of a refined mineral oil having a Saybolt viscosity at 100° F. between about 80 and 400 units; and (c) between about 5 and 30 percent by weight, based on the weight of the composition, of a colorless, odorless, non-toxic plasticizer component which is a solvent for the cellulose ether; and (2) cooling the applied coating on the article to a hardened condition.

2. The method of claim 1, wherein said article of food is in a frozen condition during the application of said composition.

3. The method of claim 1, wherein said composition is applied to the article by dip coating the composition thereon and wherein the ethyl cellulose has a viscosity not in excess of about 30 centipoises.

4. The method of claim 1, wherein said composition is applied to the article by dip coating the composition thereon; and wherein said composition is comprised of from about 20 to 35 percent by weight, based on the weight of the composition, of ethyl cellulose having a viscosity not in excess of about 30 centipoises; from 50 to 65 percent of said refined mineral oil; and from 5 to 20 percent by weight of said non-toxic plasticizer component.

5. The method of claim 1, wherein said composition is applied to said article by spray coating the composition thereover; and wherein said ethyl cellulose has a viscosity not in excess of about 50 centipoises.

6. The method of claim 1, wherein said composition is applied to said article by spray coating said composition thereover; and wherein said composition is comprised of from about 20 to 50 percent by weight, based on the weight of the composition, of ethyl cellulose having a viscosity not in excess of about 50 centipoises; from about 30 to 65 percent by weight of said refined mineral oil; and from about 5 to 20 percent by weight of said non-toxic plasticizer component.

7. The method of claim 1, wherein said composition contains in combination therewith and in addition thereto up to about 20 percent by weight, based on the weight of the composition, of an epoxidized long chain fatty acid triglyceride derived from unsaturated fatty acids that contain from 12 to 22 carbon atoms in their structure.

8. A method in accordance with the method set forth in claim 7, wherein said epoxidized natural glyceride of unsaturated fatty acids is an epoxidized soya bean oil.

9. The method of claim 1, wherein said composition contains in combination therewith and in addition thereto up to about 3 percent by weight, based on the weight of the composition, of a non-toxic antioxidant for said cellulose ether.

10. The method of claim 1, wherein said composition contains in combination therewith and in addition thereto up to about 2 percent by weight, based on the weight of the composition, of a hydroxy acid selected from the group consisting of citric acid and tartaric acid.

11. The method of claim 1, wherein said composition contains in combination therewith and in addition thereto up to about 5 percent by weight, based on the weight of the composition, of a wax ingredient melting above about 100° F.

12. A method in accordance with the method set forth in claim 11, wherein said wax ingredient is paraffin wax.

13. The method of claim 1, wherein said plasticizer component is acetyl tributyl citrate.

14. The method of claim 1, wherein said plasticizer component is butyl phthalyl butyl glycolate.

15. The method of claim 1, wherein said plasticizer component is comprised of a refined and deodorized castor oil.

16. A coated food article as produced by the method of claim 1.

References Cited in the file of this patent
UNITED STATES PATENTS

| Number | Name | Date |
|---|---|---|
| 2,082,592 | Nollau | June 1, 1937 |
| 2,349,134 | Bradshaw | May 16, 1944 |
| 2,373,278 | Traylor | Apr. 10, 1945 |
| 2,551,463 | Ramsbottom | May 1, 1951 |
| 2,558,042 | Cornwell | June 26, 1951 |
| 2,577,211 | Scharf | Dec. 4, 1951 |
| 2,682,475 | Smith | June 29, 1954 |